June 4, 1957   H. J. CHARETTE   2,794,655
TRAILER STEERING DEVICE
Filed Jan. 7, 1955   2 Sheets-Sheet 2
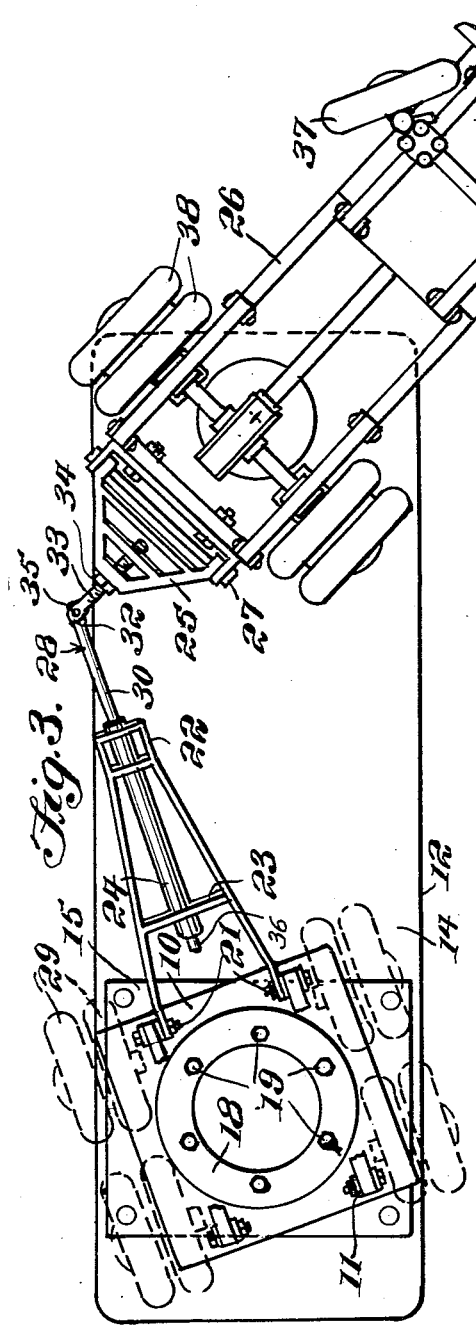
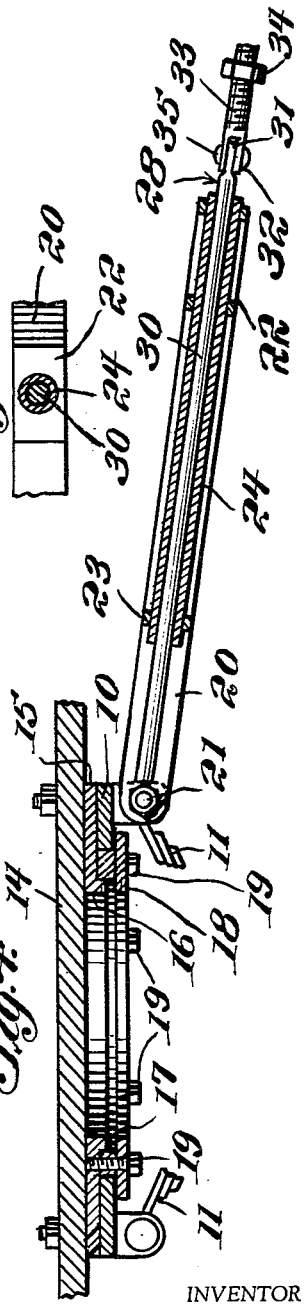
INVENTOR
*Harry J. Charette*
BY
ATTORNEYS

United States Patent Office 2,794,655
Patented June 4, 1957

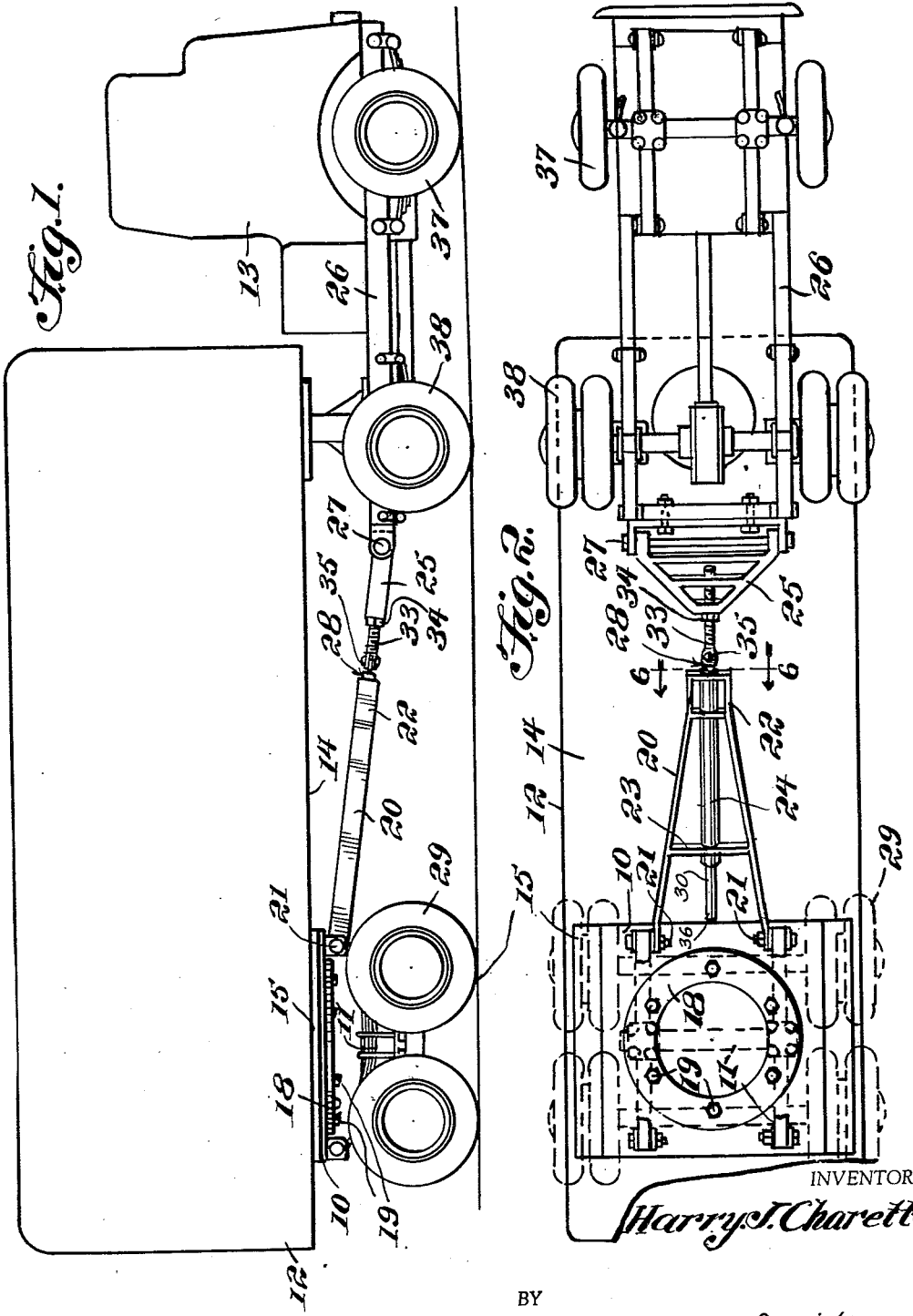

2,794,655

TRAILER STEERING DEVICE

Harry J. Charette, Amherst, Mass.

Application January 7, 1955, Serial No. 480,409

2 Claims. (Cl. 280—426)

The present invention relates to steering devices for trailers in towing vehicle-trailer assemblies.

The primary object of the present invention is to provide a steering device for the trailer in a towing vehicle-trailer assembly which permits the trailing of the trailer rear wheels substantially in the tracks of the rear wheels of the tractor or other towing vehicle enabling the assembly to turn corners on a shorter radius.

Another object of the present invention is to provide a steering device for a trailer which permits the rear wheels of the trailer to swing outwardly to one side when the towing vehicle has turned to the other side, permitting the turning of the towing vehicle-trailer assembly around short curves with the trailer substantially in the tracks of the towing vehicle.

A further object of the present invention is to provide a steering device for the rear wheels of a towing vehicle-trailer assembly which is adjustable and may be used with trailers of varying lengths.

A still further object of the present invention is to provide a steering device for the rear wheels of a tractor-trailer assembly having a fifth wheel upon which is supported the front end of the trailer and one in which the mechanism for rotating the rear wheels of the trailer may be added to the trailer and to the tractor without interfering with the operation of the fifth wheel of the tractor.

These and other objects and advantages of the present invention will be fully apparent from the following description when taken in connection with the annexed drawings, in which:

Figure 1 is a side view in elevation of a tractor-trailer assembly showing the present invention in use, Figure 2 is a bottom view of a tractor-trailer assembly shown in Figure 1, Figure 3 is another bottom view showing the action of the present invention to rotate the rear wheels of the tractor-trailer assembly, Figure 4 is a detailed view of the mechanism of the present invention, Figure 5 is a further detailed view of the jointed connection, showing the component parts in exploded view, and Figure 6 is a view partially in cross-section on line 6—6 of Figure 2.

Referring in greater detail to the drawings in which like numerals indicate like parts throughout the several views, the invention consists of a platform 10 to which is secured the spring and axle assembly indicated in Figure 1 by the reference numeral 11 and which is dependingly and rotatively connected beneath the rear end of a trailer 12 in a trailer-tractor vehicle, the tractor portion being indicated by the reference numeral 13.

Referring to Figures 2 and 4, the platform 10 is rotatively connected to the floor 14 or the spring and axle assembly 11 with a bearing plate 15 interposed between the platform 10 and the floor 14. The centers of both the platform 10 and the bearing plate 15 are formed with large apertures, the bearing plate 15 also having an annular shoulder 16 which extends downwardly and on the outer edge of which is positioned a spacer ring 17 fitting within the aperture in the platform 10, and forming a bearing for side thrust.

Another ring 18 overlies the ring 17 and the inner edge of the platform 10 and is secured to the bearing plate 15 by means of the plurality of bolts 19 which connect the assembly together so that the platform 10 is rotatably mounted upon the bearing plate 15.

A steering member 20 including a pair of arms arranged in converging relation is positioned so that the converging ends project forwardly from the front end of the platform 10 and is connected by the diverging ends of its arms to the platform by means of a pivot pin 21 which permits it to have a pivotal movement upwardly and downwardly with respect to the platform 10.

The converging ends of the arms of the steering member 20 is formed with a box frame 22, and a cross-brace 23 cooperates with the box frame 22 to support a tubular housing 24.

A U-shaped steering member is arranged so that the bight faces and is adjacent the box frame 22 with the legs projecting forwardly of the box frame 22 and is connected by the ends of its legs to the frame 26 of the tractor 13 by means of the pivot pins 27 which permit it to have a pivotal motion upwardly and downwardly beneath the front end of the trailer 12.

A jointed member 28 connects the steering member 20 and the steering member 25 together so that when the tractor 13 pivots with respect to the trailer 12 the platform 10 will rotate beneath the trailer 12 carrying with it the spring and axle assembly and turning the wheels 29 in the direction opposite to those at the front end of the tractor 13 which have caused the pivotal movement of the tractor with respect to the trailer.

One end of the jointed member 28 is positioned between the arms of the steering member and consists of a rod 30 slidable within the tubular housing 24, and has the other end projecting from the tubular housing formed with an eye formation 31 which fits between the bifurcated end 32 of a coupling pin 33. The latter is threaded on its other end and is received through an aperture in the bight of the steering member 25 with a lock nut 34 adjustably securing the coupling pin 33 against rotation. A pivot pin 35 is provided to traverse the holes formed in the bifurcated end 32 of the coupling pin 33 and the eye formation 31 of the rod 30.

It will be seen therefore that the free end 36 of the rod 30 will slide back and forth in extensile and retractile movement within the tubular housing 24 whenever the steering member 20 and the steering member 25 are swung away from the normal trailing position of the steering member with respect to the steering member.

It will be seen therefore that whenever the wheels 37 on the front end of the tractor 13 are turned, the tractor rear wheels 38 will substantially follow the wheels 37 and the interconnection of the steering member and the steering member will effect the rotative movement of the platform 10 and its associated wheels 29 so that the wheels 29 will substantially trail behind the wheels 37 and 38 within their tracks.

While only preferred embodiments of the present invention have been here illustrated and described, it is believed that other embodiments may be made and practiced within the scope of the appended claims without departing from the spirit of the invention.

What is claimed is:

1. For use with a towing vehicle trailer assembly, a trailer steering device comprising a steering member, means provided on said steering member for pivotally attaching the latter to a towing vehicle, a coupling pin projecting from said steering member, another steering member embodying a pair of arms arranged in converging relation positioned in trailing relation with respect to said steering member so that the converging ends are adjacent to said steering member, a box frame connecting the converging ends of said arms together, a rod positioned between said arms and slidably supported intermediate its ends in said box frame, the end of said rod adjacent said coupling pin being connected to said coupling pin for turning movement about a vertical axis, and a wheel-supported platform arranged adjacent the diverging ends of said arms and being pivotally connected to said diverging ends of said arms, said platform being adapted to be attached to a trailer body.

2. For use with a towing vehicle-trailer assembly, a trailer steering device comprising a steering member embodying a U-shaped element, means provided for pivotally attaching the legs of said element to a towing vehicle, a coupling pin carried by the bight of said element, another steering member embodying a pair of arms arranged in converging relation positioned in trailing relation with respect to said coupling pin so that the converging ends of said arms are adjacent to said pin, a box frame connecting the converging ends of said arms together, a rod positioned between said arms and slidably supported intermediate its ends in said box frame, the end of said rod adjacent said coupling pin being connected to said coupling pin for turning movement about a vertical axis, and a wheel-supported platform arranged adjacent the diverging ends of said arms and being pivotally connected to said diverging ends of said arms, said platform being adapted to be attached to a trailer body.

References Cited in the file of this patent

UNITED STATES PATENTS

| 1,597,634 | Stephens | Aug. 24, 1926 |
| 2,520,776 | Page | Aug. 29, 1950 |
| 2,676,715 | Pridy | Apr. 27, 1954 |

FOREIGN PATENTS

| 715,698 | Germany | Jan. 6, 1942 |
| 2,084 of 1915 | Great Britain | Jan. 27, 1916 |
| 187,150 | Great Britain | Oct. 19, 1922 |
| 166,631 | Switzerland | Mar. 16, 1934 |